US009965823B2

(12) United States Patent
Ha et al.

(10) Patent No.: US 9,965,823 B2
(45) Date of Patent: May 8, 2018

(54) MIGRATION OF GRAPHICS PROCESSING UNIT (GPU) STATES

(71) Applicant: Microsoft Technology Licensing, LLC, Redmond, WA (US)

(72) Inventors: Kiryong Ha, Pittsburgh, PA (US); Paramvir Bahl, Bellevue, WA (US); David Chiyuan Chu, Kirkland, WA (US); Eduardo Cuervo, Bellevue, WA (US); Lenin Ravindranath Sivalingam, Bellevue, WA (US); Alastair Wolman, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 255 days.

(21) Appl. No.: 14/630,830

(22) Filed: Feb. 25, 2015

(65) Prior Publication Data
US 2016/0247248 A1 Aug. 25, 2016

(51) Int. Cl.
*G06T 1/20* (2006.01)
*G06F 9/455* (2018.01)
*G06F 9/48* (2006.01)

(52) U.S. Cl.
CPC .............. *G06T 1/20* (2013.01); *G06F 9/455* (2013.01); *G06F 9/45558* (2013.01); *G06F 9/48* (2013.01); *G06F 2009/4557* (2013.01)

(58) Field of Classification Search
None
See application file for complete search history.

(56) References Cited

U.S. PATENT DOCUMENTS

| 7,872,656 B2 * | 1/2011 | Stauffer ............... G06F 3/14 345/522 |
| 2009/0160865 A1 | 6/2009 | Grossman |
| 2010/0091025 A1 | 4/2010 | Nugent et al. |
| 2010/0141664 A1 | 6/2010 | Rawson et al. |
| 2011/0084973 A1 | 4/2011 | Masood |
| 2011/0102443 A1 | 5/2011 | Dror et al. |
| 2012/0290643 A1 * | 11/2012 | Fok Ah Chuen ....... H04W 4/02 709/203 |
| 2013/0057560 A1 | 3/2013 | Chakraborty et al. |

(Continued)

FOREIGN PATENT DOCUMENTS

CN 101419558 A 4/2009

OTHER PUBLICATIONS

Lin et al., "OpenGL Application Live Migration with GPU Acceleration in Personal Cloud". HPDC'10, Jun. 20-25, 2010, Chicago Illinois, USA, Copyright 2010 ACM 978-1-60558-942-8/10/06.*

(Continued)

*Primary Examiner* — Maurice L McDowell, Jr.
*Assistant Examiner* — Donna J Ricks
(74) *Attorney, Agent, or Firm* — International IP Law Group, PLLC

(57) ABSTRACT

The claimed subject matter includes techniques for live migration of a graphics processing unit (GPU) state. An example method includes receiving recorded GPU commands from a relay at a destination GPU. The method also includes replaying the recorded GPU commands at the destination GPU. The method also includes detecting a downtime for the GPU commands. The method further includes establishing a connection between the destination GPU and the client during the detected downtime.

9 Claims, 9 Drawing Sheets

(56) References Cited

U.S. PATENT DOCUMENTS

| | | | | |
|---|---|---|---|---|
| 2015/0015588 | A1* | 1/2015 | Guy | G06F 3/14 345/501 |
| 2015/0163270 | A1* | 6/2015 | Lyons | H04L 65/60 463/42 |
| 2015/0277763 | A1* | 10/2015 | Zhou | G06F 9/45558 711/105 |
| 2015/0339168 | A1* | 11/2015 | Mason | G06F 9/5027 718/104 |
| 2015/0378783 | A1* | 12/2015 | Tarasuk-Levin | G06F 9/45558 718/1 |
| 2016/0184712 | A1* | 6/2016 | Colenbrander | A63F 13/79 463/29 |

OTHER PUBLICATIONS

Gottschlag et al., "LoGV: Low-overhead GPGPU Virtualization", 2013 IEEE International Conference on High Performance Computing and Communications & 2013 IEEE International Conference on Embedded and Ubiquitous Computing, Nov. 13, 2013.*

Elliott, et al., "GPUSync: A Framework for Real-Time GPU Management", In IEEE 34th Real-Time Systems Symposium, Dec. 3, 2013, pp. 33-44.

Gottschlag, et al., "LoGV: Low-overhead GPGPU Virtualization", In 10th IEEE International Conference on High Performance Computing and Communications, Nov. 13, 2013, 6 pages.

Gottschlag, Mathias, "Virtualization and Migration with GPGPUs", In Bachelor Thesis, Jun. 14, 2013, 54 pages.

Lagar-Cavilla, et al., "VMM-Independent Graphics Acceleration", In Proceedings of the 3rd international conference on Virtual execution environments, Jun. 13, 2007, pp. 33-43.

Lin, et al., "OpenGL Application Live Migration with GPU Acceleration in Personal Cloud", In Proceedings of the 19th ACM International Symposium on High Performance Distributed Computing, Jun. 20, 2010, pp. 280-283.

Nafch, et al., "Transparent Checkpoint-Restart for Hardware-Accelerated 3D Graphics", In Proceedings of the Computing Research Repository, Dec. 2013, 20 pages.

Rahim, Shad, "State of GPU Virtualization for CUDA Applications 2014", Published on: Jul. 23, 2014 Available at: http://www.acceleware.com/blog/state-gpu-virtualization-cuda-applications-2014.

Xiao, et al., "Transparent Accelerator Migration in a Virtualized GPU Environment", In Proceedings of the 12th IEEE/ACM International Symposium on Cluster, Cloud and Grid Computing, May 13, 2012, 8 pages.

Takizawa, et al., "CheCL: Transparent Checkpointing and Process Migration of OpenCL Applications", In IEEE International Parallel & Distributed Processing Symposium, May 16, 2011, pp. 864-876.

"The EDGE Wiki", Retrieved on: Oct. 22, 2014 Available at: https://microsoft.sharepoint.com/teams/TheEdge/wiki/Pages/The%20EDGE%20wiki.aspx.

* cited by examiner

MIGRATION OF GRAPHICS PROCESSING UNIT (GPU) STATES

BACKGROUND

Modern applications or games hosted on servers can have video processed using graphics processing units (GPUs) and software renderers on servers and the resulting video streams can be played back on client devices such as mobile devices. For example, the client devices can send input to the servers and receive compressed video streams in response.

SUMMARY

The following presents a simplified summary of the innovation in order to provide a basic understanding of some aspects described herein. This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

An implementation provides a system for live migration of a graphics processing unit (GPU) state. The system includes a first module to record GPU commands at a source GPU, the first module to send the GPU commands to a destination GPU, the destination GPU to replay the recorded GPU commands. The system also includes a second module to predict a downtime for the GPU commands at the source GPU that is below a threshold time. The system further includes a third module to connect a client to the destination GPU at the detected downtime.

Another implementation provides a method for live migration of a graphics processing unit (GPU) state. The method includes receiving recorded GPU commands from a relay at a destination GPU. The method also includes replaying the recorded GPU commands at the destination GPU. Further the method includes detecting a downtime for the GPU commands. The method also further includes establishing a connection between the destination GPU and the client during the detected downtime.

Another implementation provides one or more computer-readable storage medium for storing computer readable instructions that, when executed by one or more processing devices, instruct the live migration of a graphics processing unit (GPU) state. The computer-readable medium include instructions to record a snapshot of a GPU state of a source GPU. The computer-readable medium also include instructions to record GPU commands from a virtual machine at the source GPU and store the recorded GPU commands to a log file. The computer-readable medium include instructions to send the log file and the snapshot to a destination GPU. Further, the computer-readable medium include instructions to predict a downtime for the GPU commands at the source GPU. The computer-readable medium also include instructions to switch a relay to connect the client to the destination GPU during the predicted downtime.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
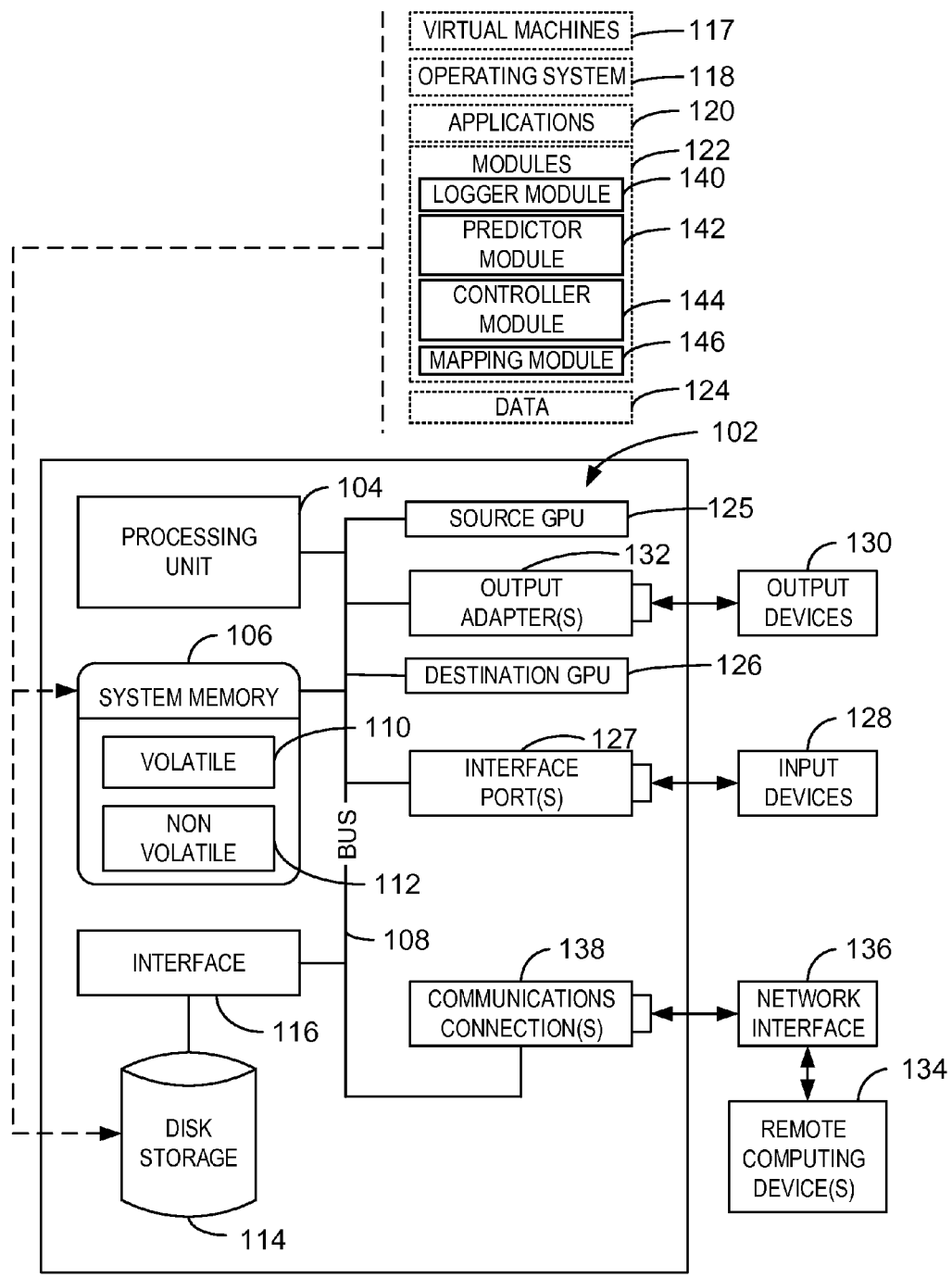
FIG. 1 is a block diagram of an example operating environment configured for implementing various aspects of the techniques described herein.

Virtual machines using software renderers and graphics processing units (GPUs) can be used to provide video rendering services for applications and games controlled by client devices. Virtual machines deployed in cloud settings offer relatively quick startup time, but generally provide slow runtime performance. An application may already be installed on a cloud server and thus startup time may be relatively quick. However, the network distance between the client and the rendering virtual machine may result in a slower runtime. Thus, when a client uses a remote virtual machine for rendering services, the location of the virtual machine has a significant impact on client performance. Virtual machines deployed in micro datacenters (MDCs), on the other hand, offer relatively good performance due to low latency and close proximity to clients, but include a provisioning time that manifests as a longer startup time for games or applications. A micro datacenter (MDC) as used herein, refers to one or more computer resources that may be closer to a client device. MDCs can be accessed by clients through a private network, such as a local wireless network, without going through the Internet. For example, a company can host an MDC on its property. In some examples, an MDC may be in every building of a property. In some examples, a company can host MDCs in retail stores. Hence, MDCs may have very low latencies. Furthermore, a GPU or software renderer tied to one or more particular virtual machines can be underutilized for a variety of reasons. For example, if each virtual machine is dedicated to one user, then the associated GPU or software renderer may not be fully utilized. In another example, application utilization can change over time, resulting in underutilized GPU or software rendering resources. In some examples, fragmentation of GPU resources can also result in underutilization of GPU resources.

This disclosure describes techniques for real-time or live GPU state migration. For example, a source GPU can execute instructions or GPU commands for a client running an application or game. A GPU command, as used herein, refers to an instance of an action by a particular client sent to a particular GPU. In some embodiments, the GPU state migration can include migrating the execution of the GPU commands from a source GPU to a destination GPU. In some embodiments, GPU commands transmitted from a Guest VM to a source GPU are recorded and stored. The recorded GPU commands can then be sent to a new renderer and forwarded to a destination GPU, wherein the GPU commands can be executed or replayed to rebuild a GPU state of the source GPU. At a detected downtime, when the number of GPU commands transmitted from the client to the source GPU is below a downtime threshold, the client device can then be connected to the destination GPU rather than the source GPU. Any remaining GPU commands can then be executed or replayed by the destination GPU.

In some examples, the GPU commands can be saved in logs. In some examples, the logs can also include parameters such as resource identifiers (IDs). In some examples, the resource IDs can be mapped to logical IDs. The techniques described herein enable live migration of GPU states to destination GPUs that are underutilized and/or closer to the client. Furthermore, the present techniques enable migration between software and hardware processing depending on workload and availability of GPU or software rendering capability. Moreover, the live migration performed using the present techniques results in an improved user experience because of the reduced video stream latency.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware can include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like can refer to computer-related entities, hardware, and software in execution, firmware, or combination thereof. A component can be a process running on a processor, an object, an executable, a program, a function, a subroutine, a computer, or a combination of software and hardware. The term, "processor," can refer to a hardware component, such as a processing unit of a computer system.

Furthermore, the claimed subject matter can be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, can include communication media such as transmission media for wireless signals and the like.

FIG. 1 is intended to provide a brief, general description of a computing environment in which the various techniques described herein can be implemented. For example, a method and system for live migration of GPU states can be implemented in such a computing environment. While the claimed subject matter has been described above in the general context of computer-executable instructions of a computer program that runs on a local computer or remote computer, the claimed subject matter also can be implemented in combination with other program modules. Generally, program modules include routines, programs, components, data structures, or the like that perform particular tasks or implement particular abstract data types.

FIG. 1 is a block diagram of an example operating environment configured for implementing various aspects of the techniques described herein. The example operating environment 100 includes a computer 102. The computer 102 includes a processing unit 104, a system memory 106, and a system bus 108.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

The basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/non-volatile computer storage media. FIG. 1 shows, for example a disk storage 114. Disk storage 114 includes, but is not limited to, devices like a magnetic disk drive, floppy disk drive, tape drive, Jaz drive, Zip drive, LS-210 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes virtual machines (VMs) 117 and an operating system 118. Virtual machines 117 can be used to efficiently allocated resources of the computer 102. A virtual machine can communicate with an operating system or hardware via a hypervisor. An operating system 118, which can be stored on disk storage 114, acts to control and allocate resources of the computer 102. In some examples, a hypervisor can also directly control resources of the computer 102. In some examples, a hypervisor can control resources of the computer 102 via an operating system 118. In some examples, a guest VM comprising a guest operating system (OS) can run one or more applications or games.

System applications 120 take advantage of the management of resources by operating system 118 through program modules 122 and program data 124 stored either in system memory 106 or on disk storage 114. It is to be appreciated that the claimed subject matter can be implemented with various operating systems or combinations of operating systems.

Source GPU 125 can be used to process GPU commands received from processing unit 104 and produce video output. The source GPU 125 can be a video card or an integrated graphics chip, among others. The destination GPU 126 can also be used to process GPU commands and produce a video stream. In some examples, GPU commands to be processed by the source GPU 125 can be recorded and replayed on the destination GPU 126 as discussed below.

A user enters commands or information into the computer 102 through input devices 128. Input devices 128 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. The input devices 128 connect to the processing unit 104 through the system bus 108 via interface ports 127. Interface ports 127 include, for example, a serial port, a parallel port, a game port, and a universal serial bus (USB). Output devices 130 use some of the same type of ports as input devices 128. Thus, for example, a USB port can be used to provide input to the computer 102, and to output information from computer 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices provide both input and output capabilities such as remote computers 134.

The computer 102 can be a server hosting various software applications in a networked environment using logical connections to one or more remote computers, such as remote computers 134. The remote computers 134 can be client systems configured with web browsers, PC applications, mobile phone applications, and the like. The remote computers 134 can be a personal computer, a server, a router, a network PC, a workstation, a microprocessor based appliance, a mobile phone, tablet, slate, other hybrid and/or convertible mobile device, a peer device or other common network node and the like, and typically includes many or all of the elements described relative to the computer 102.

Remote computers 134 can be logically connected to the computer 102 through a network interface 136 and then connected via a communication connection 138, which can be wireless. Network interface 136 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 can include, for exemplary purposes, internal and external technologies such as, mobile phone switches, modems including regular telephone grade modems, cable modems and DSL modems, ISDN adapters, and Ethernet cards.

One or more modules 122 can be configured to perform migration of GPU states. A logger module 140 can record GPU commands at a source GPU 125. The logger module 140 can send the GPU commands to a destination GPU 126, the destination GPU 126 to execute or replay the recorded GPU commands. Replaying recorded commands refers to executing the commands on the destination GPU 126. For example, GPU commands can be replayed at the destination GPU 126 to rebuild a GPU state of the source GPU 125. A predictor module 142 can predict a downtime for the GPU commands at the source GPU 125 that is below a threshold time. A controller module 144 can send instructions to a relay to connect a client to the destination GPU 126 at the detected downtime. The logger module 140 can then send remaining GPU commands to the destination GPU 126 in a log.

In some examples, the logger module 140 can also record a snapshot of a GPU state of the source GPU 125. A snapshot as used herein, refers to data that includes a current GPU state of a GPU and a set of pointers to the data. The logger module 140 can record the GPU commands at the source GPU 125 after the snapshot is created. In some examples, a mapping module 146 can generate a map linking GPU resource identifiers and logical resource identifiers. For example, each of the GPU commands can include an object with a GPU resource identifier that is to be mapped to a particular logical resource identifier. In some examples, the logger module 140 can record the parameters at the time a call starts and return parameters are not yet visible. As a result, the logger module 140 can create a logical ID, and then fill in the logical ID to source GPU ID when the call completes or when a later call occurs that uses the same resource. In some examples, the controller module 144 can use the map to schedule a plurality of threads for execution. For example, each thread can include one or more logical resource identifiers. In some examples, the destination GPU 126 is located in a machine that is closer to the client than the source GPU 125. The GPU commands can include one of a plurality of GPU commands to be processed at the destination GPU 126. In some examples, the GPU commands are recorded to a log file with timestamps corresponding to the time of the recording.

An example processing unit 104 for the server can be a computing cluster. Additionally, the disk storage 114 can store various types of data 124 used to migrate GPU state live. For example, the disk storage 114 can comprise an enterprise data storage system storing data 124 such as GPU commands. For example, a GPU command can include a posting or a rendering of frame buffers, textures, among other GPU resources. The GPU commands can be used to reconstruct a GPU state as discussed at greater length with respect to FIGS. 5-8 below. The data 124 can also include one or more logs, which can contain the GPU commands. In some examples, the data 124 can also include resource IDs among other parameters.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional modules, additional memory devices, additional network interfaces, etc.). Furthermore, any of the functionalities of the logger module 140, the predictor module 142, the controller module 144, and the mapping module 146, can be partially, or entirely, implemented in hardware and/or in a processor. For example, the functionality can be implemented with an application specific integrated circuit, in logic implemented in the processor, or in any other device. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs), etc.

Figure 2:
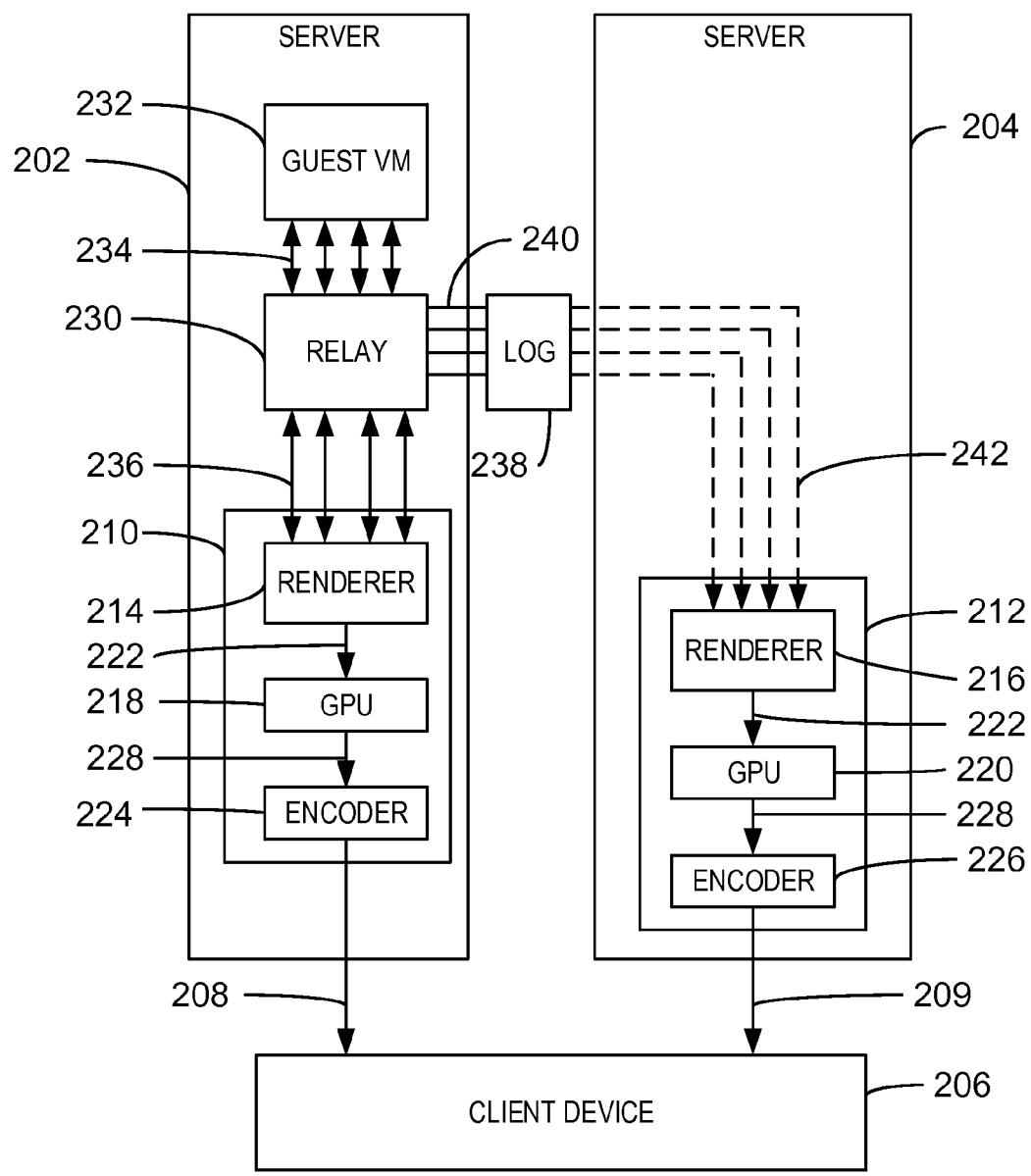
FIG. 2 is a block diagram of an example system for live GPU state migration.

FIG. 2 is a block diagram of an example system for live GPU state migration. The example system is generally referred to by the reference number 200.

In FIG. 2, example system 200 includes two servers 202, 204 that are both communicatively connected to a client device 206 as indicated by video streams 208, 209. The servers 202, 204 each have a graphics subsystem 210, 212 that includes a respective renderer 214, 216 connected to a GPU 218, 220 via a link 222. Each GPU 218, 220 is also connected to an encoder 224, 226 via a link 228. The server 202 also contains a Relay 230 that is connected to a Guest Virtual Machine (VM) 232 via connections 234 and the renderer 214 of graphics subsystem 210 via connections 236. The Relay 230 can produce and send a log 238 as indicated by connections 240, 242.

In the example system 200, a client device 206 initially receives a video stream 208 from the encoder 224 of the first server 202. For example, the first server 202 can be a node in a cloud environment that provides a quick startup time. A game or application may run on a Guest VM 232 that can receive input from client device 206 and produce GPU commands to be forwarded by the renderer 214 to the GPU 218. The GPU 218 may process the GPU commands and send frame buffers to the video encoder 224 of the graphics subsystem 210. A Guest VM 232, as used herein, refers to a virtual machine that runs an application or game via a guest operating system (OS). The Guest VM 232 can send GPU commands via the Relay 230 to be rendered at the renderer 214. The renderer 214 can be a software program that accepts GPU commands through a network connection such as a TCP connection. The renderer 214 can then forward the GPU commands to the GPU 218. The GPU 218 can generate frame buffers from the GPU commands. The GPU 218 can send the frame buffers to the encoder 224 to encode the frame buffers into video streams. Thus, the processing of GPU commands on the server 202 can result in a video stream 208 that client device 206 receives in response to sending the GPU commands to server 202. For example, the video stream 208 can include fully rendered and encoded 3D graphics of a video game or the simpler graphics of a mobile application.

In example system 200 of FIG. 2, the video rendering for client device 206 can be migrated to server 204 such that the client device 206 begins to receive streaming video 208 from server 204 instead of server 202. For example, the second server 204 may be a server 204 that is closer in proximity to client device 206 than server 202 or has more available resources on its GPU 218 than the first server 202 has on its GPU 220. A Relay 230 can create a log 238 of GPU commands from client device 206 received at Guest VM 232. For example, the log 238 can include log data with corresponding stream IDs to distinguish TCP streams and timestamps of captured GPU commands. In some examples, the log can be stored in an in-memory queue. For example, the log can be stored on RAM memory rather than being written to disk. The Relay 230 can relay the log 238 via network connections 240, 242 to the second server 204. In some examples, the Relay 230 can relay the log 232 to the destination GPU 220 until the remaining log size is under a threshold size. For example, individual GPU commands in the log can be replayed at the destination GPU 220 and then discarded from the log. Thus, the log size reduces as the destination GPU 220 replays commands. The system 200 can then stop relaying data on all connections and redirect all the connections to the destination server. The Relay 230 can then restart relaying connection data to the destination renderer 216. For example, the connection data can be TCP states. The graphics subsystem 212 of server 204 can then send the GPU commands from the renderer 216 to the GPU 220 to produce frame buffers and encode video on encoder 226. Thus, the graphics subsystem 212 may rebuild the GPU state of the source GPU 218. The client device 206 can then interact with a game or application at the Guest VM 232. The Guest VM 232 sends GPU commands to the server 204 and the client device 206 receives video stream 209 from the second server 204. In some examples, the client device 206 may experience little or no interruption in the video stream 208, 209 as a result of the live migration. In some examples, the Relay 230 can be encapsulated inside the VM to maintain TCP states between the Guest VM 232 and the Relay 230 as described in greater detailed in FIG. 4 below. Thus, time and resources are saved by not creating new TCP connections between the Relay and the Guest VM 232 before migrating the GPU state.

It is to be understood that the block diagram of FIG. 2 is not intended to indicate that the example system 200 is to include all of the components shown in FIG. 2. Rather, the example system 200 can include fewer or additional components not illustrated in FIG. 2 (e.g., additional virtual machines, additional GPUs, additional client devices, additional network interfaces, etc.).

Figure 3:
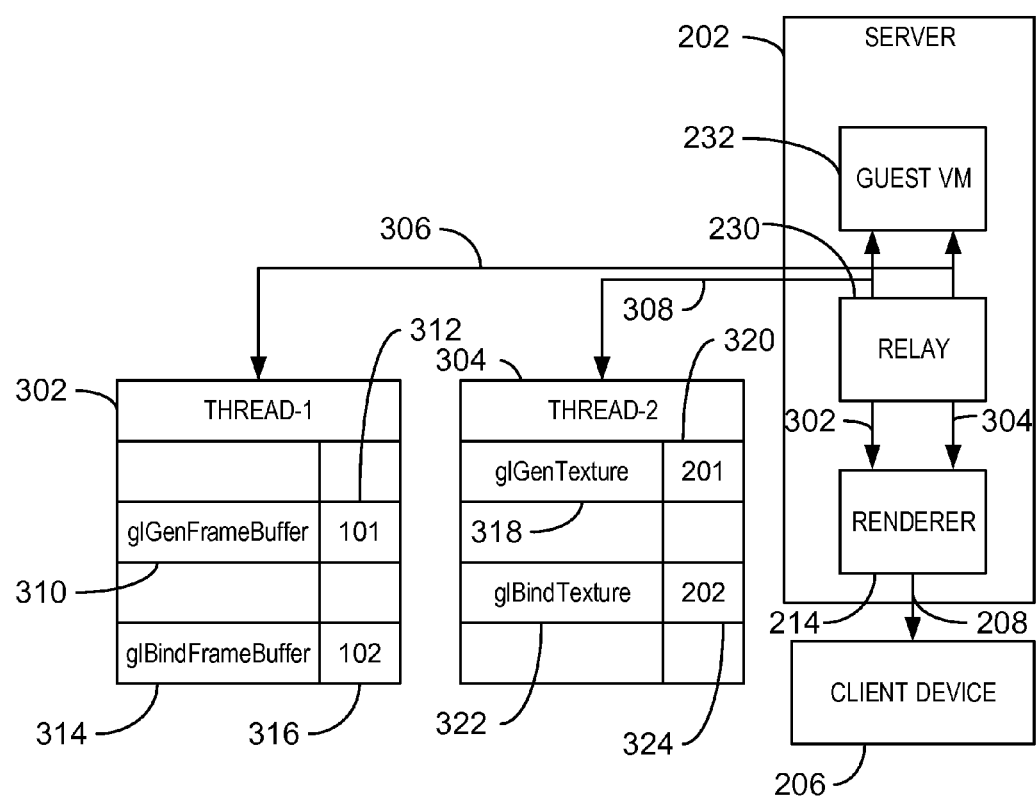
FIG. 3 is a block diagram of an example system for ordering GPU commands using resource identifiers.

FIG. 3 is a block diagram of an example system for ordering GPU commands using resource identifiers. The example system is generally referred to by the reference number 300.

In FIG. 3, the Guest VM 232 of the first server 202 from FIG. 2 is shown receiving two threads 302, 304 from the Relay 230. As used herein, a thread refers to a sequence of code running in the Guest VM. In some examples, the application or game may generate GPU commands in multiple threads on the Guest VM. The Relay 230 is shown sending the two threads 302, 304 to the renderer 214. The renderer 214 is shown sending a video stream 208 to client device 206. Callout 306 indicates that a thread 302 includes a first resource 310 with a resource ID 312 and a second resource 314 with the resource ID 316. Callout 308 indicates that thread 304 includes a first resource 318 with a resource ID 320 and a second resource 322 with the resource ID 324.

In the example system 300 of FIG. 3, the two threads 302, 304 are being replayed by the renderer 214 after having been recorded and receiving resource IDs 312, 316, and 320, 324 respectively. In some examples, the Relay 230 relays GPU commands from individual threads over their own private TCP connections, one TCP connection for each thread that issues GPU commands. Thus, multiple TCP connections are shown in between the Guest VM 232 and the relay 230 and the renderer 214.

At the time of logging, the two threads 302, 304 may have had different resource IDs, of any suitable numerical value, originally assigned by the source GPU. In some examples, the original resource IDs can be mapped to the commands and new resource IDs within predefined ranges of values in order to maintain consistent resource IDs at replay time. For example, a GPU workflow can include 1) creating a GPU resource such as a texture or frame buffer, 2) returning a resource ID from the GPU, 3) using the resource ID for further operations, and 4) deleting the resource when it is no longer being used. Therefore, GPU generated resource IDs are reused for different resources over time. Moreover, if the resource IDs are not consistent at replay time, the GPU commands can fail due to having an invalid resource ID. In some examples, a mapping table can therefore be used to map between GPU generated resource IDs and logical resource IDs. For example, the logical resource IDs can be generated by an application and used to keep track of GPU generated resource IDs for different resources and translated back to GPU generated resource IDs during replay at a different GPU.

In addition, the CPU may schedule threads in different orders. For example, multiple threads may be processed in parallel and a thread that executes first on a source GPU can be executed in a different order on the destination GPU. Therefore, a resource ID range can be allocated for each thread. For example, the range 100-199 can be allocated for a first thread and the range 200-299 can be allocated for a second thread. The resources in each thread can then be assigned a resource ID value from the allocated resource ID range for the thread. For example, the resource glGenFrameBuffer 310 and the resource glBindFrameBuffer 314 of Thread-1 302 have been assigned resource IDs 312, 316 of "101" and "102," respectively, from the range 100-199. Moreover, Thread-2 304 has been assigned the resourced ID values "201" and "202" for resource IDs 320, 324 of its resources glGenTexture 318 and glBindTexture 322, respectively. Although a TCP send/receive buffer size in the Relay 230 could be set to "0" to prevent changing execution order, a buffer size of "0" may result in a slowdown of replay. Therefore, the present technique allows execution order to be maintained for proper replay order on the destination GPU without slowing down replay of the GPU commands.

It is to be understood that the block diagram of FIG. 3 is not intended to indicate that the example system 300 is to include all of the components shown in FIG. 3. Rather, the example system 300 can include fewer or additional components not illustrated in FIG. 3 (e.g., additional virtual machines, additional GPUs, additional client devices, additional network interfaces, etc.).

Figure 4:
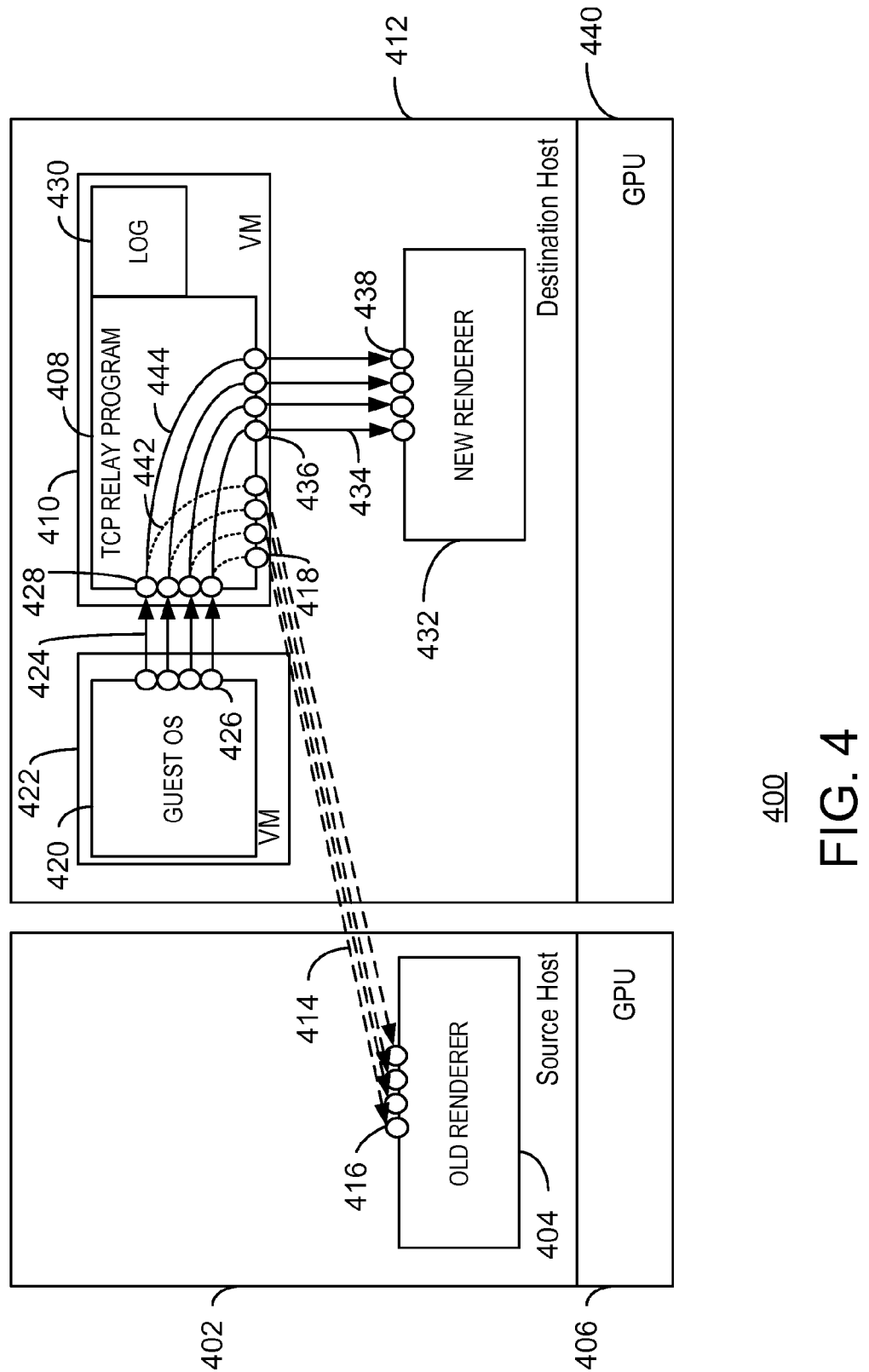
FIG. 4 is a block diagram of an example system for maintaining Transmission Control Protocol (TCP) states using a relay encapsulated in a virtual machine (VM)

FIG. 4 is a block diagram of an example system for maintaining TCP states using a Relay 408 encapsulated in a virtual machine (VM) 410. The example system of FIG. 4 is generally referred to by the reference number 400. Although TCP is used in FIG. 4 as an example, User Datagram Protocol (UDP) or any other suitable protocol may be used instead.

In the example system 400 of FIG. 4, a source host 402 contains an old renderer 404 and a source GPU 406. The old renderer 404 is communicatively coupled to the TCP Relay Program 408 of a virtual machine (VM) 410 of a destination host 412 via links 414 between ports 416 of the older renderer 404 and ports 418 of the TCP Relay Program 408. The TCP Relay Program 408 is also communicatively coupled to a Guest OS 420 of a Guest VM 422 via a link 424 between ports 426 of the Guest OS 420 and ports 428 of the TCP Relay Program 408. The VM 410 also contains a log 430. The TCP Relay Program is also communicatively coupled to a new renderer 432 of destination host 412 via links 434 between ports 436 of TCP Relay program 408 and ports 438 of the new renderer 432. The destination host 412 also contains a destination GPU 440. Ports 428 are communicatively coupled to ports 418 via links 442. Ports 428 are also communicatively coupled to ports 436 via links 444.

Traditional VM migration techniques include migration of a Guest VM. A Relay program may be stopped at a source machine and recreated at the destination machine. However, when the Guest VM is resumed after migration, it may not be able to communicate with the Relay because the TCP state saved by the guest VM will be mismatched with the new Relay. Instead of stopping the old relay program and creating a new relay program at the destination, the present techniques run a Relay 408 inside a VM 410.

In FIG. 4, the Relay, or TCP Relay Program, 408 of VM 410 has switched a TCP stream from using links 442 to using a different set of links 444 connected to ports 436. In some examples, because the TCP Relay Program 408 is a software program that is encapsulated inside the VM 410, the TCP Relay Program 408 can maintain TCP states with the Guest OS 420 via links 424. For example, the TCP state can include sequence numbers, acknowledgment (ACK) numbers, windows sizes, and timeouts, among other state. During migration, the destination host 412 can suspend links with the old renderer 404 and store the log 430 containing GPU commands. As used herein, the source host and destination host are physical machines that can contain the GPUs 406, 440, renderers 404, 432, and VMs 410, 422. In some examples, the log 430 can be saved to a persistent disk of destination host 412. In some examples, the destination host 412 can start a new renderer 432 and resume the TCP Relay Program 408 after switching to links 444. When the Guest OS 420 of the VM 422 resumes operation, the Guest OS 420 can restore the TCP communication on the links 424 since the TCP states match at the Guest OS 420 and the TCP Relay Program 408. Thus, the Guest OS 420 and the TCP Relay Program 406 encapsulated in the VM 410 can be migrated to a destination host 412 using traditional VM migration techniques while maintaining the TCP state between the Guest OS 420 and the TCP Relay Program 408 at links 424.

In some examples, the destination host 412 can have the new renderer 432 forward GPU commands to a new hardware GPU 440 or can start a new software GPU 440. For example, the GPU commands can include commands to create and remove resources, draw shapes, objects, textures, create frame buffers, etc. The destination host 412 can then resume the Guest OS 420 and the TCP Relay Program 408 with links to the new hardware or software-based GPU 440. In some examples, the TCP Relay Program 408 replays GPU commands from the log 430 to the new renderer 432. The TCP Relay Program 408 can then redirect the TCP connection to ports 436 via links 444 and the Guest OS 420 can send GPU commands to the new renderer 432 via links 434. The resources of the previously used GPU 406 of the source host 402 can then be deallocated.

It is to be understood that the block diagram of FIG. 4 is not intended to indicate that the example system 400 is to include all of the components shown in FIG. 4. Rather, the example system 400 can include fewer or additional components not illustrated in FIG. 4 (e.g., additional virtual machines, additional GPUs, additional client devices, additional network interfaces, etc.).

Figure 5:
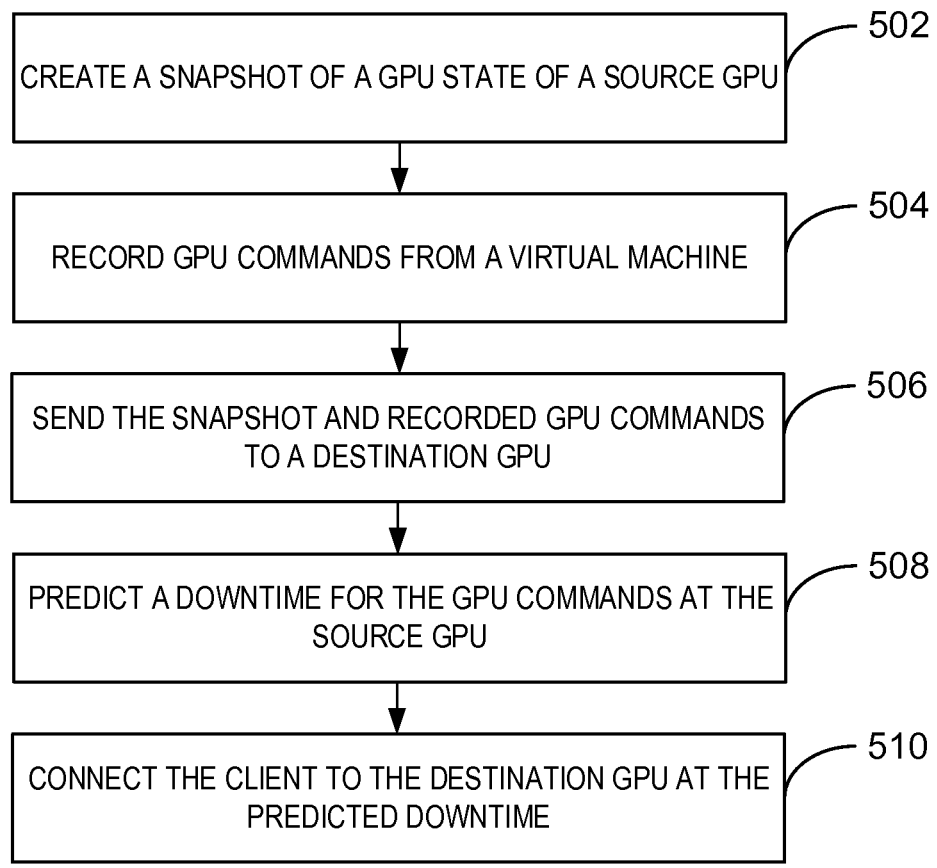
FIG. 5 shows a process flow diagram of a method for live GPU state migration from the perspective of a source GPU.

FIG. 5 shows a process flow diagram of a method for live GPU state migration from the perspective of a source GPU. The example method of FIG. 5 is generally referred to by the reference number 500 and discussed with reference to FIG. 1.

At block 502, the logger module 140 creates a snapshot of a GPU state of a source GPU. For example, a set of pointers can be created that point to one or more blocks of data that forms the current state of the source GPU. The underlying data can then be saved and transferred later. The GPU state may be used by the GPU to render objects, textures, graphics, etc., and create a frame buffer. Thus, the snapshot can be used to recreate a GPU state faster by not having to replay as many commands. This can save GPU resources by not having to replay all the commands to restore a GPU state completely by replaying commands associated with the state of the source GPU captured by the snapshot.

At block 504, the logger module 140 records GPU commands from a virtual machine (VM). For example, the logger module 140 can record GPU commands transmitted from a VM to a renderer. For example, GPU commands can include commands to create and remove resources, draw shapes, objects, textures, create frame buffers, etc. In some examples, the logger module 140 can save the GPU commands to a log file. For example, the log file can be stored in a system memory 106. If a snapshot was taken as in block 502, the logger module 140 can begin recording GPU commands after the point in time that the snapshot was taken.

At block 506, the logger module 140 sends the snapshot and recorded GPU commands to a destination GPU. For example, the destination GPU can be a GPU that is closer to the client, the destination GPU can have a smaller latency than the source GPU, or the destination GPU can contain a larger amount of available resources. In some examples, the destination GPU can alternatively be a software renderer that emulates a GPU. In some examples, the GPU commands can be sent in the form of a log file. For example, the log file can contain timestamps and resource IDs, among other parameters for each of the GPU commands.

At block 508, the predictor module 142 predicts a downtime for the GPU commands at the source GPU. The predictor module 142 can predict when the downtime for migration falls below a threshold amount of time. In some examples, the predictor module 142 can use historical usage patterns to predict the downtime. For example, the predictor module 142 can predict the behavior of an application or game based on previous behavior. In some examples, the predictor module 142 can dynamically monitor the behavior of the application or game. For example, if the user is reading a page in an application and not interacting with the application, the client may send less input to the VM because the screen is not changing much. The predictor module 142 may thus determine a downtime and begin the process or migration. In some examples, the predictor module 142 can monitor the pace at which GPU commands are generated by the client. For example, instead of monitoring application or game behavior, the predictor module 142 can monitor the number of GPU commands produced by a Guest VM and predict a downtime when the number of GPU commands are below a threshold level. Migration as used herein, may refer to migrating the client such that the destination GPU processes GPU commands from the client rather than the source GPU. For example, the downtime may occur because of a momentary stop in relaying of all data. For example, all TCP data on all connections may be stopped and the relay redirected to a new renderer.

At block 510, the controller module 144 connects the client to connect to the destination GPU at the predicted downtime. For example, a Guest VM, Relay and renderer can be migrated to a new host machine. In some examples, a relay may be connected to a new renderer during the predicted downtime. The Guest VM can then send GPU commands to the destination GPU via the new renderer instead of the source GPU via new connections at the Relay. Thus, the client may receive a video stream from the destination GPU.

This process flow diagram is not intended to indicate that the blocks of the method 500 are to be executed in any particular order, or that all of the blocks are to be included in every case. Further, any number of additional blocks not shown may be included within the method 500, depending on the details of the specific implementation.

Figure 6:
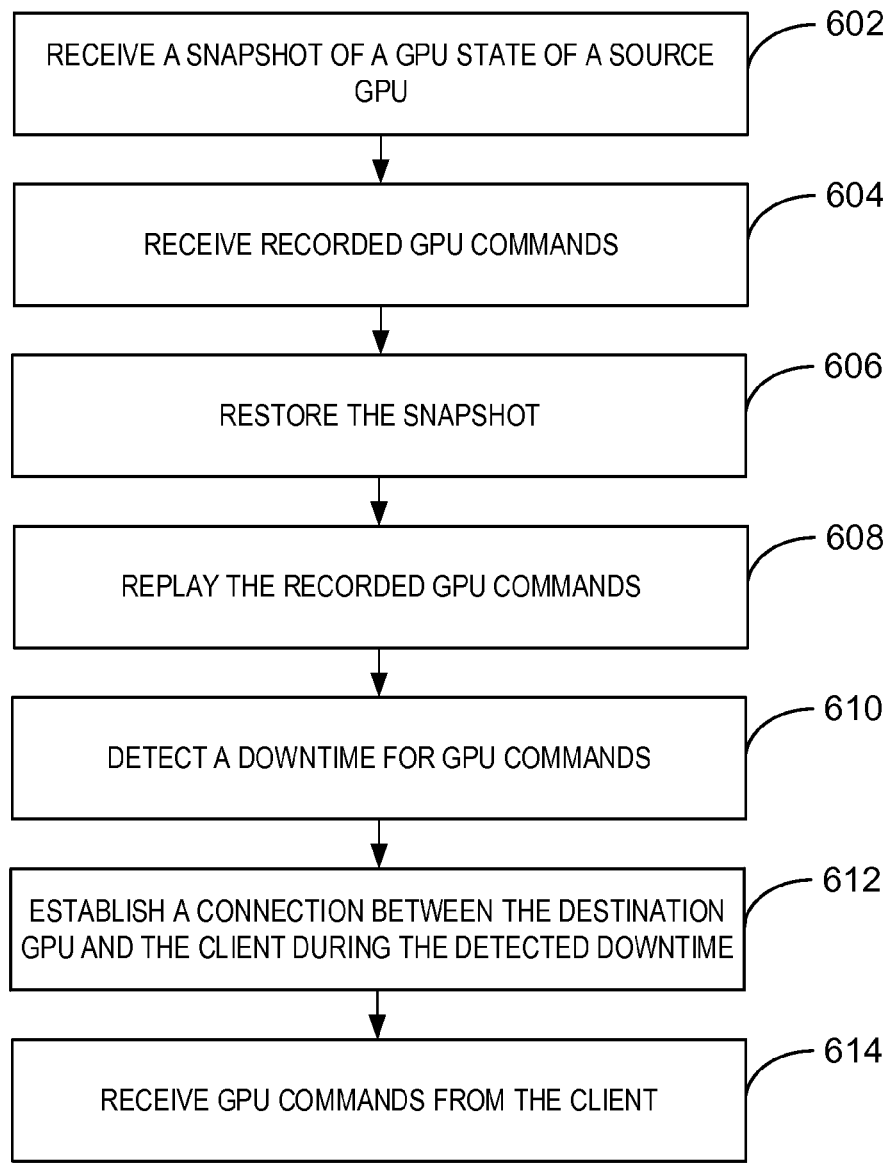
FIG. 6 shows a process flow diagram of a method for live GPU state migration from the perspective of a destination GPU.

FIG. 6 shows a process flow diagram of a method for live GPU state migration from the perspective of a destination GPU 220. The example method of FIG. 6 is generally referred to by the reference number 600 and is discussed with reference to FIG. 2.

At block 602, the destination GPU 220 receives a snapshot of a GPU state of a source GPU 218. For example, the snapshot can be a set of pointers to data forming the current state of the source GPU 218.

At block 604, the destination GPU 220 receives recorded GPU commands. For example, the GPU commands can include commands to create and remove resources, draw shapes, objects, textures, create frame buffers, etc. The GPU commands may have been recorded at the source GPU and may have originated from the interaction of a client device with a Guest VM 232. In some examples, the recorded GPU commands can be stored into a log 238. In some examples, the destination GPU 220 receives the recorded GPU commands from a relay. For example, the destination GPU 220 may be coupled to a renderer that receives the GPU commands from the relay via one or more TCP links.

At block 606, the destination GPU 220 restores the snapshot. For example, the data referenced by pointers captured by the snapshot can be copied from the source GPU 218 to the destination GPU 220. Thus, the destination GPU 220 can then have the same state as the source GPU had at the point that the snapshot was taken. For example, upon restoring the snapshot, the destination GPU 220 can include the same values for any number of registers, pointers, call stacks, and the like that existed in the source GPU 218 at the point in time during which the snapshot was captured.

At block 608, the destination GPU 220 replays the recorded GPU commands. In some examples, the destination GPU 220 can rebuild the GPU state of the source GPU by replaying the recorded commands stored in the log 238. In some examples, the destination GPU 220 can rebuild the source GPU 218 state by replaying the recorded commands of the log 238 after restoring the snapshot of the GPU state of the source GPU 218. Replaying the recorded GPU commands can include executing the GPU commands stored in the log file 238 in sequential order based on any suitable identifier such as a timestamp.

At block 610, the destination GPU 220 detects a downtime for GPU commands. For example, the destination GPU 220 can receive a predicted downtime from the predictor module of the source GPU machine 202. In some examples, the destination GPU 220 can replay recorded GPU commands up to and including the downtime. The predicted downtime can be used to connect a client to a new renderer 216 and GPU 220 with less noticeable latency.

At block 612, the destination GPU 220 establishes a connection between the destination GPU and the client during the detected downtime. For example, a Relay 230 can be used to establish a new connection 240, 242 to the destination GPU 220 via a new renderer 216. In some examples, the Relay 230, the Guest VM 232, and/or the renderer 214 can be migrated to the server 204 during the detected downtime. The Relay 230 can switch connections to the new renderer 216 during the downtime. In some examples, the Relay 230 can encapsulated in a VM to maintain TCP states with the Guest VM 232 as described in FIG. 4. In some examples, because a snapshot of the source GPU 218 was restored, and additional source GPU commands replayed, the destination GPU 220 can begin executing commands immediately. Thus, a user of the game or application using the migrated GPU states may not experience any noticeable interruption of service. In some examples, resources in a system can be allocated dynamically by detecting an underutilized GPU and migrating the client 206 to the underutilized GPU. Thus, migration according to techniques described herein allows efficient use of existing resources without noticeable interruption of service.

At block 614, the destination GPU 220 receives GPU commands from the client 206. For example, the destination GPU 220 can receive the GPU commands via the Relay 230 from the Guest VM 232 after the downtime. The client 206 may interact with the Guest VM 232 to produce the GPU commands. In some examples, the destination GPU 220 may receive commands from a plurality of clients. Thus, resources can be dynamically allocated by processing GPU commands from a plurality of clients at the destination GPU. In some examples, resources can be dynamically allocated by detecting an underutilized GPU and migrating the client to an underutilized destination GPU. In some examples, resources can be dynamically allocated between a software renderer and a hardware renderer by migrating the client between the software renderer and the hardware renderer.

This process flow diagram is not intended to indicate that the blocks of the method 600 are to be executed in any particular order, or that all of the blocks are to be included in every case. Further, any number of additional blocks not shown may be included within the method 600, depending on the details of the specific implementation.

Figure 7:
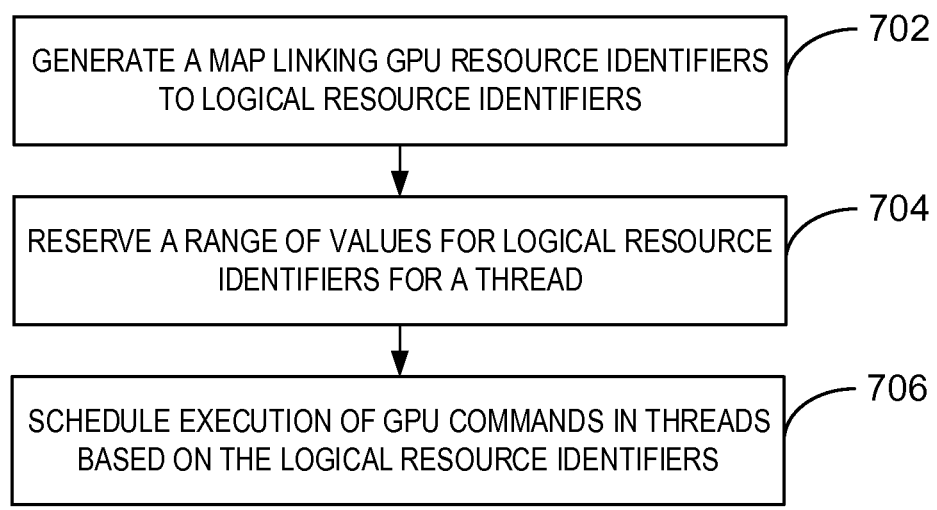
FIG. 7 shows a process flow diagram of a method for ordering GPU commands using resource identifiers.

FIG. 7 shows a process flow diagram of a method for ordering GPU commands using resource identifiers. The example method of FIG. 7 is generally referred to by the reference number 700 and is discussed with reference to FIG. 1.

At block 702, the mapping module 146 generates a map linking GPU resource identifiers to logical resource identifiers (IDs). A map, as referred to herein, can include any suitable data structure that can store GPU resource identifiers and logical resource identifiers. In some examples, the GPU resource identifiers can indicate an execution order from a source GPU and the logical resource identifiers can indicate an execution order from an application. In some embodiments, the GPU resource IDs may have been generated by a GPU while the logical resource IDs can be generated by an application.

At block 704, the mapping module 146 reserves a range of values for logical resource identifiers for a thread. For example, a thread may have values 100-199, or any other suitable numerical values, reserved. The GPU commands in the thread can then receive logical resource IDs from this value range. For example, one GPU command in a particular thread can receive the value "1" and a subsequently received command can receive the value "2" as a logical resource ID value.

At block 706, the controller module 144 schedules execution of GPU commands in threads based on the logical resource identifiers. For example, the controller module 144 can include instructions to coordinate with a scheduler in an operating system that determines the order in which instructions are to be executed. In some examples, commands with logical resource identifiers that are lower can have priority over commands with logical resource identifiers that are higher in value. For example, the command with logical resource ID of "1" can have priority over the command with logical resource ID "2." Therefore, the command with logical resource ID "1" can be executed prior to the command with logical resource ID "2." In some examples, a map can be used to determine the logical resource identifier for a particular command.

This process flow diagram is not intended to indicate that the blocks of the method 700 are to be executed in any particular order, or that all of the blocks are to be included in every case. Further, any number of additional blocks not shown may be included within the method 700, depending on the details of the specific implementation.

Figure 8:
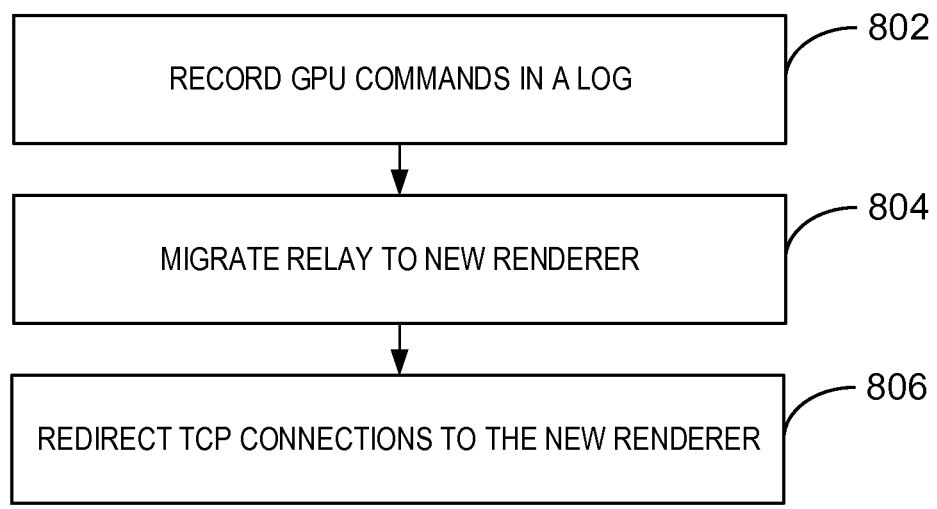
FIG. 8 shows a process flow diagram of a method for maintaining TCP states using a relay.

FIG. 8 shows a process flow diagram of a method for maintaining TCP states using a Relay 406. The example method of FIG. 8 is generally referred to by the reference number 800 and discussed with reference to FIG. 4.

At block 802, the Relay 408 records GPU commands in a log 430. In some examples, the Relay 408 is a software program that is encapsulated in a virtual machine (VM) 410. The Guest OS 420 of Guest VM 422 may be sending commands to a renderer 404 via the links 442 at Relay 408 and links 414. The Relay 408 can thus be used to maintain TCP states between the Guest OS 420 and the Relay 408.

At block 804, the Relay 408 is migrated to a new renderer 432. For example, the new renderer 432 may be associated with a destination GPU 440 to be used in a destination host machine 412. The Relay 408 can create new links 444 to the new renderer 432. The Relay 408 can then send GPU commands from the log 430 to be forwarded by the new renderer 432 to be replayed at the destination GPU 440. The destination GPU 440 can replay the GPU commands to rebuild a GPU state of the source GPU 406.

At block 806, the Relay 408 redirects TCP connections to the new renderer 432. Since the Relay 408 maintains TCP states with the Guest OS 420 of Guest VM 422, these TCP states can continue to be used between the Guest OS and the Relay 408 after establishing new links 444, 434 with the new renderer 432. The Relay 408 may thus reduce downtime associated with recreating new TCP connections between the Guest OS 420 and the Relay 408. Furthermore, since the destination GPU 440 rebuilds the state of the source GPU 406, the destination GPU 440 can receive GPU commands from the new renderer 432 and continue producing frame buffers from the point at which the source GPU 406 had stopped production during the migration. Thus, a client device receiving a video stream during the migration may not experience any interruption in the video stream. For example, real world experiments performed using different applications all indicated downtimes of less than 50 milliseconds.

This process flow diagram is not intended to indicate that the blocks of the method 800 are to be executed in any particular order, or that all of the blocks are to be included in every case. Further, any number of additional blocks not shown may be included within the method 800, depending on the details of the specific implementation.

Figure 9:
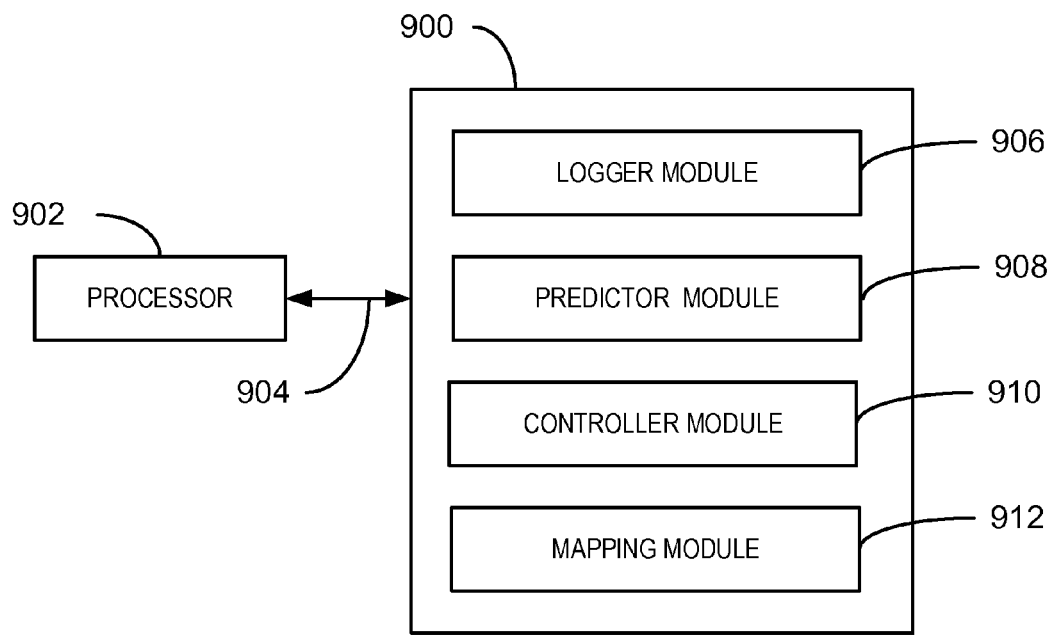
FIG. 9 is a block diagram of an example computer-readable storage medium that can be used to migrate GPU states.

FIG. 9 is a block diagram showing a tangible, computer-readable storage medium that can be used to migrate GPU states. The tangible, computer-readable storage media 900 can be accessed by a processor 902 over a computer bus 904. Furthermore, the tangible, computer-readable storage media 900 can include code to direct the processor 902 to perform the current methods. For example, methods 500, 600, 700, and 800 can be performed by the processor 902.

The various software components discussed herein can be stored on the tangible, computer-readable storage media 900, as indicated in FIG. 9. For example, the tangible computer-readable storage media 900 can include a logger module 906, a predictor module 908, a controller module 910, and a mapping module 912. In some implementations, the logger module 906 includes code to record a snapshot of a GPU state of the source GPU. In implementations, the logger module 906 also includes code to record GPU commands from a virtual machine at the source GPU and store the recorded GPU commands to a log file. The predictor module 908 includes code to predict a downtime for the GPU commands at the source GPU. The controller module can include code to send the log file and the snapshot to a destination GPU. The controller module 908 includes code to switch a relay to connect the client to the destination GPU during the predicted downtime.

In some examples, the mapping module 912 includes code to generate a map linking GPU resource identifiers and logical resource identifiers, each of the GPU commands comprising an object with a GPU resource identifier that is to be mapped to a particular logical resource identifier. In some examples, the logger module 906 includes code to create a new set of Transmission Control Protocol (TCP) links and restore a GPU state of the source GPU on a destination GPU before the relay switches to the destination GPU.

It is to be understood that any number of additional software components not shown in FIG. 9 can be included within the tangible, computer-readable storage media 900, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

Example 1

This example provides for a system for live migration of a graphics processing unit (GPU) state. The system includes a first module to record GPU commands at a source GPU. The first module can send the GPU commands to a destination GPU. The destination GPU can replay the recorded GPU commands. The system also includes a second module to predict a downtime for the GPU commands at the source GPU that is below a threshold time. The system further also includes a third module to connect a client to the destination GPU at the detected downtime. Alternatively, or in addition, the first module can further record a snapshot of a GPU state of the source GPU. Alternatively, or in addition, the first module can also record the GPU commands at the source GPU in response to recording the snapshot. Alternatively, or in addition, the system can include a fourth module to generate a map linking GPU resource identifiers and logical resource identifiers. Each of the GPU commands can include an object with a GPU resource identifier that is to be mapped to a logical resource identifier. Alternatively, or in addition, the third module can utilize the map to schedule a plurality of threads for execution. Alternatively, or in addition, each thread can include one or more logical resource identifiers. Alternatively, or in addition, the third module includes a relay encapsulated in a virtual machine, the relay communicatively coupled to a guest virtual machine (VM) via a Transmission Control Protocol (TCP) link. The relay can create a new TCP connection to a new renderer and send a GPU state log to the new renderer before switching the TCP link of the guest virtual machine to the new renderer. The new renderer can be communicatively coupled to the destination GPU. Alternatively, or in addition, the destination GPU can be located in a machine that is closer in proximity to a client device than the source GPU. The client device may produce the GPU commands. Alternatively, or in addition, the guest VM can include a guest operating system (OS) that is to run one or more applications or games. Alternatively, or in addition, the GPU commands can be recorded to a log file with corresponding timestamps.

Example 2

This example provides for a method for live migration of a graphics processing unit (GPU) state. The method includes receiving recorded GPU commands from a relay at a destination GPU. Further the method includes replaying the recorded GPU commands at the destination GPU. The method also includes detecting a downtime for the GPU commands. The method further also includes establishing a connection between the destination GPU and the client during the detected downtime. The method also includes replaying remaining recorded GPU commands while establishing the connection with the client. Alternatively, or in addition, the method can include receiving a snapshot of a GPU state of the source GPU. Alternatively, or in addition, the recorded GPU commands can include commands received at the source GPU after the snapshot was created. Alternatively, or in addition, the method can include restoring the snapshot on the destination GPU before replaying the recorded GPU commands. Alternatively, or in addition, the method can include receiving a map linking GPU resource identifiers to logical resource identifiers. Alternatively, or in addition, each of the GPU commands comprising an object with a GPU resource identifier that is to be mapped to a particular logical resource identifier. Alternatively, or in addition, the method can include utilizing the map to order GPU commands in a thread for execution, each thread containing one or more logical resource identifiers. Alternatively, or in addition, the destination GPU can be located in a machine that is closer in proximity to the client than the source GPU. Alternatively, or in addition, the method can include processing GPU commands from a plurality of clients at the destination GPU. Alternatively, or in addition, the method can include dynamically allocating resources by detecting an underutilized GPU and connecting the client to the underutilized GPU. Alternatively, or in addition, the method can include dynamically allocating resources between a software renderer and a hardware renderer by connecting the client between the software renderer and the hardware renderer. Alternatively, or in addition, the method can include dynamically allocating resources by processing GPU commands from a plurality of clients at the destination GPU.

Example 3

This example provides for one or more computer-readable storage medium for storing computer readable instructions that, when executed by one or more processing devices, instruct the live migration of a graphics processing unit (GPU) state. The computer-readable medium include instructions to record a snapshot of a GPU state of a source GPU. The computer-readable medium also include instructions to record GPU commands from a virtual machine at the source GPU and store the recorded GPU commands to a log file. The computer-readable medium include instructions to send the log file and the snapshot to a destination GPU. Further, the computer-readable medium include instructions to predict a downtime for the GPU commands at the source GPU. The computer-readable medium include instructions to switch a relay to connect the client to the destination GPU during the predicted downtime. Alternatively, or in addition, the instructions can generate a map linking GPU resource identifiers and logical resource identifiers. Alternatively, or in addition, each of the GPU commands can include an object with a GPU resource identifier that is to be mapped to a logical resource identifier. Alternatively, or in addition, the instructions can create a new set of Transmission Control Protocol (TCP) connections and restore a GPU state of the source GPU on a destination GPU before the relay switches to the destination GPU.

Example 4

This example provides for a system for live migration of a graphics processing unit (GPU) state. The system includes a processor and a system memory including code to direct the processor. When executed this code can cause the processor to record GPU commands at a source GPU. When executed this code can also cause the processor to send the GPU commands to a destination GPU. The destination GPU can replay the recorded GPU commands. This code can also cause the processor to predict a downtime for the GPU commands at the source GPU that is below a threshold time. This code can also cause the processor to connect a client to the destination GPU at the detected downtime. Alternatively, or in addition, the code can also cause the processor to further record a snapshot of a GPU state of the source GPU. Alternatively, or in addition, the code can also cause the processor to record the GPU commands at the source GPU in response to recording the snapshot. Alternatively, or in addition, the code can also cause the processor to generate a map linking GPU resource identifiers and logical resource identifiers. Each of the GPU commands can include an object with a GPU resource identifier that is to be mapped to a logical resource identifier. Alternatively, or in addition, code can also cause the processor to utilize the map to schedule a plurality of threads for execution. Alternatively, or in addition, each thread can include one or more logical resource identifiers. Alternatively, or in addition, the system can include a relay encapsulated in a virtual machine, the relay communicatively coupled to a guest virtual machine (VM) via a Transmission Control Protocol (TCP) link. The relay can create a new TCP connection to a new renderer and send a GPU state log to the new renderer before switching the TCP link of the guest virtual machine to the new renderer. The new renderer can be communicatively coupled to the destination GPU. Alternatively, or in addition, the destination GPU can be located in a machine that is closer in proximity to a client device than the source GPU. The client device may produce the GPU commands. Alternatively, or in addition, the guest VM can include a guest operating system (OS) that is to run one or more applications or games. Alternatively, or in addition, the GPU commands can be recorded to a log file with corresponding timestamps.

Example 5

This example provides for a system for live migration of a graphics processing unit (GPU) state. The system includes means for recording GPU commands at a source GPU. The system also includes means for sending the GPU commands to a destination GPU. The destination GPU can replay the recorded GPU commands. The system also includes means for predicting a downtime for the GPU commands at the source GPU that is below a threshold time. The system further also includes means for migrating a client to the destination GPU at the detected downtime. Alternatively, or in addition, the system can include means for recording a snapshot of a GPU state of the source GPU. Alternatively, or in addition, the system can include means for recording the GPU commands at the source GPU in response to recording the snapshot. Alternatively, or in addition, the system can include means for generating a map linking GPU resource identifiers and logical resource identifiers. Each of the GPU commands can include an object with a GPU resource identifier that is to be mapped to a logical resource identifier. Alternatively, or in addition, system can include means for utilizing the map to schedule a plurality of threads for execution. Alternatively, or in addition, each thread can include one or more logical resource identifiers. Alternatively, or in addition, the system can include means for creating a new TCP connection to a new renderer and send a GPU state log to the new renderer before switching the TCP link of the guest virtual machine to the new renderer.

Alternatively, or in addition, the destination GPU can be located in a machine that is closer in proximity to a client device than the source GPU. The client device may produce the GPU commands. Alternatively, or in addition, the guest VM can include a guest operating system (OS) that is to run one or more applications or games. Alternatively, or in addition, the GPU commands can be recorded to a log file with corresponding timestamps.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for live migration of graphics processing unit (GPU) states, the method comprising:
   receiving a snapshot of a GPU state of a source GPU;
   restoring the snapshot of the source GPU at a destination GPU;
   receiving a predicted downtime comprising a time that a number of additional recorded GPU commands to be received from the source GPU is predicted to be below a threshold level based on a predicted behavior of an application or a game, wherein the predicted behavior is based on a previous behavior of the application or the game;
   receiving GPU commands recorded after the snapshot and up to and including the predicted downtime from a relay at the destination GPU;
   replaying the received recorded GPU commands at the destination GPU up to the predicted downtime; and
   switching the relay to connect the destination GPU to a client at the predicted downtime.

2. The method of claim 1, further comprising receiving a map linking GPU resource identifiers to logical resource identifiers, each of the GPU commands comprising an object with a GPU resource identifier that is to be mapped to a particular logical resource identifier.

3. The method of claim 2, further comprising utilizing the map to order GPU commands in a thread for execution, each thread containing one or more logical resource identifiers.

4. The method of claim 2, wherein GPU commands with logical resource identifiers that are lower are given higher priority over GPU commands with logical resource identifiers that are higher in value.

5. The method of claim 1, the destination GPU located in a machine that is closer in proximity to the client than the source GPU.

6. The method of claim 1, further comprising processing GPU commands from a plurality of clients at the destination GPU.

7. The method of claim 6, further comprising dynamically allocating resources by detecting an underutilized GPU and migrating the client to the underutilized GPU.

8. The method of claim 6, further comprising dynamically allocating resources between a software renderer and a hardware renderer by migrating the client between the software renderer and the hardware renderer.

9. The method of claim 6, further comprising dynamically allocating resources by processing GPU commands from a plurality of clients at the destination GPU.

* * * * *